United States Patent
KK et al.

(10) Patent No.: US 11,272,209 B2
(45) Date of Patent: Mar. 8, 2022

(54) METHODS AND APPARATUS FOR DETERMINING ADJUSTMENT PARAMETER DURING ENCODING OF SPHERICAL MULTIMEDIA CONTENT

(71) Applicant: SAMSUNG ELECTRONICS CO., LTD., Suwon-si (KR)

(72) Inventors: Ramkumaar KK, Bangalore (IN); Sri Nitchith Akula, Bangalore (IN); Chirag Mahesh Kumar Pujara, Bangalore (IN); Anubhav Singh, Bangalore (IN); Akhil Konda, Bangalore (IN); Raj Narayana Gadde, Bangalore (IN); Amith Dsouza, Bangalore (IN); Nishant Sharma, Bangalore (IN); Kwangpyo Choi, Seoul (KR); Woongil Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/970,564

(22) PCT Filed: Apr. 3, 2019

(86) PCT No.: PCT/KR2019/003938
§ 371 (c)(1),
(2) Date: Aug. 17, 2020

(87) PCT Pub. No.: WO2019/194572
PCT Pub. Date: Oct. 10, 2019

(65) Prior Publication Data
US 2021/0112275 A1 Apr. 15, 2021

(30) Foreign Application Priority Data

Apr. 3, 2018 (IN) .............................. 201841012719
Mar. 19, 2019 (IN) .............................. 201841012719

(51) Int. Cl.
*H04N 19/597* (2014.01)
*H04N 19/14* (2014.01)
(Continued)

(52) U.S. Cl.
CPC ........... *H04N 19/597* (2014.11); *H04N 13/10* (2018.05); *H04N 13/139* (2018.05); *H04N 19/14* (2014.11)

(58) Field of Classification Search
CPC .. H04N 13/139; H04N 13/161; H04N 13/194; H04N 19/14; H04N 19/597
See application file for complete search history.

(56) References Cited

U.S. PATENT DOCUMENTS 9,584,814 B2   2/2017   Socek et al.
9,741,092 B2   8/2017   Luo et al.
(Continued)

FOREIGN PATENT DOCUMENTS

| JP | 2017532858 A | 11/2017 |
| KR | 1020110091700 A | 8/2011 |
| KR | 1020120059367 A | 6/2012 |

OTHER PUBLICATIONS

International Search Report (PCT/ISA/210) and Written Opinion (PCT/ISA/237) dated Jul. 12, 2019 issued by the International Searching Authority in International Application No. PCT/KR2019/003938.

*Primary Examiner* — Francis Geroleo
(74) *Attorney, Agent, or Firm* — Sughrue Mion, PLLC (57) ABSTRACT

Provided are methods and apparatus for determining an adjustment parameter during encoding of a spherical multimedia content which comprises finding the region of maximum concentrated energy is concentrated in the generated energy map of the spherical multimedia content, measuring the width of the maximum concentrated energy region in the generated energy map, and deriving optimal (Continued)

adjustment parameter from the width of the maximum concentrated energy region in the generated energy map.

15 Claims, 10 Drawing Sheets

(51) Int. Cl.
  *H04N 13/139* (2018.01)
  *H04N 13/10* (2018.01)

(56) References Cited

U.S. PATENT DOCUMENTS

| | | |
|---|---|---|
| 10,097,851 B2 | 10/2018 | Lee et al. |
| 10,904,531 B2 * | 1/2021 | Hendry ............... H04N 19/147 |
| 2010/0142853 A1 | 6/2010 | Fillion et al. |
| 2013/0286011 A1 | 10/2013 | Limonov et al. |
| 2017/0251208 A1 | 8/2017 | Adsumilli et al. |
| 2017/0339440 A1 | 11/2017 | Galpin et al. |
| 2021/0104014 A1 * | 4/2021 | Kolb, V ................. G06T 5/003 |

* cited by examiner

[Fig. 1A]

ERP

[Fig. 1B]

ISP

[Fig. 1C]

CMP

[Fig. 1D]

RSP

METHODS AND APPARATUS FOR DETERMINING ADJUSTMENT PARAMETER DURING ENCODING OF SPHERICAL MULTIMEDIA CONTENT

TECHNICAL FIELD

The present disclosure relates to the field of media processing and more particularly to methods and apparatus for determining an adjustment parameter during encoding of a spherical multimedia content.

BACKGROUND ART

Currently, 360 degree cameras, multi-directional cameras or omni-directional cameras such as a fish eye camera or a panoramic camera, may output Equi-Rectangular Projection (ERP) format media (such as videos, animations, images, and so on). If the ERP media is passed to the media codec for image processing, the ERP media will be compressed. For example, if the media is a video, video compression may be involved in dividing the videos into blocks, and the blocks are processed and compressed. Further, the blocks may be divided into square format or rectangular format. Accordingly, since the ERP media may have highly redundant data, the ERP media may need to be converted to another format.

DISCLOSURE OF INVENTION

Solution to Problem

Accordingly, provided is a method for determining an adjustment parameter during encoding of a spherical multimedia content. The method includes, calculating, by a processor, a square value of a gradient magnitude value associated with an edge image corresponding to spherical multimedia content, accumulating the calculated square value of the gradient magnitude value corresponding to the spherical multimedia content, generating an energy map corresponding to the spherical multimedia content based on the accumulated square value of the gradient magnitude value according to at least one of a row number and a column number associated with the spherical multimedia content, identifying a region corresponding to a maximum concentrated energy based on the energy map, determining a width of the region corresponding to the maximum concentrated energy in the energy map, and outputting the adjustment parameter based on the width of the region to encode the spherical multimedia content.

Advantageous Effects of Invention

The disclosure provides effectively adjusting parameter during encoding and/or decoding of spherical multimedia content.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

Accordingly, provided is a method for determining an adjustment parameter during encoding of a spherical multimedia content. The method includes, calculating, by a processor, a square value of a gradient magnitude value associated with an edge image corresponding to spherical multimedia content, accumulating the calculated square value of the gradient magnitude value corresponding to the spherical multimedia content, generating an energy map corresponding to the spherical multimedia content based on the accumulated square value of the gradient magnitude value according to at least one of a row number and a column number associated with the spherical multimedia content, identifying a region corresponding to a maximum concentrated energy based on the energy map, determining a width of the region corresponding to the maximum concentrated energy in the energy map, and outputting the adjustment parameter based on the width of the region to encode the spherical multimedia content.

Accordingly, provided is an apparatus for determining an adjustment parameter during encoding of a spherical multimedia content, the apparatus comprising a memory unit; and an processor coupled to the memory unit, configured to: calculate square value of a gradient magnitude value associated with an edge image corresponding to a spherical multimedia content, accumulate the square value of the gradient magnitude value corresponding to the spherical multimedia content, generate an energy map corresponding to the spherical multimedia content based on the accumulated square value of the gradient magnitude value according to at least one of a row number and a column number associated with the spherical multimedia content, identify a region corresponding to a maximum concentrated energy in the energy map, determine a width of the identified region corresponding to the maximum concentrated energy in the energy map, and output the adjustment parameter based on the width of the identified region corresponding to the maximum concentrated energy in the energy map to encode the spherical multimedia content.

MODE FOR THE INVENTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein achieve methods and apparatus for determining an adjustment parameter during encoding of spherical multimedia content. Referring now to the drawings, and more particularly to FIGS. 1 through 8c, where similar reference characters denote corresponding features consistently throughout the figures, there are shown example embodiments.

Generally, in 360 degree projection format media content, some of the portions of the video content may have a higher impact on quality as compared to other format media content. In conventional methods, during compression of the media content, all portions of the media content may be considered equally by using an equal number of pixels for all portions of the media content. Further, the conventional methods may perform frame packing of 360 degree projection format media content into a two dimension (2D) rectangular frame. Also, the encoding may be performed using conventional video codec such as High Efficiency Video Coding (HEVC) that may be codec agnostic.

However, the compression of the media content equally in all portions may result in an inefficient encoding performance.

Figure 1A:
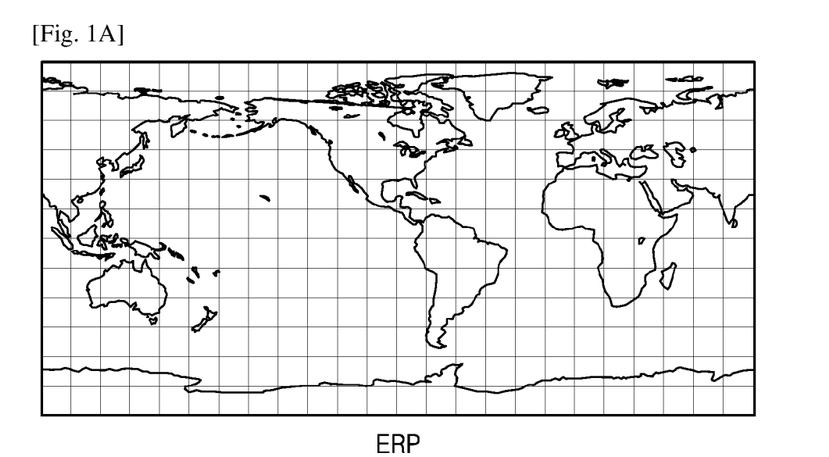
FIG. 1A illustrates an exemplary ERP projection according to an embodiment of the disclosure.

FIG. 1A illustrates an exemplary ERP according to an embodiment of the disclosure. Referring to FIG. 1A, a spherical map may be projected onto a two dimensional plane based on ERP.

Figure 1B:
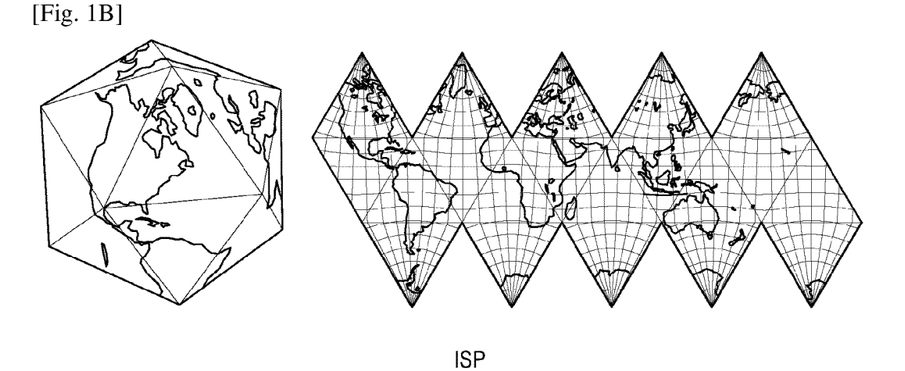
FIG. 1B illustrates an exemplary Icosahedral Projection (ISP) according to an embodiment of the disclosure.

FIG. 1B illustrates an exemplary Icosahedral Projection (ISP) according to an embodiment of the disclosure. Referring to FIG. 1B, a spherical map may be projected onto an icosandron based on ISP.

Figure 1C:
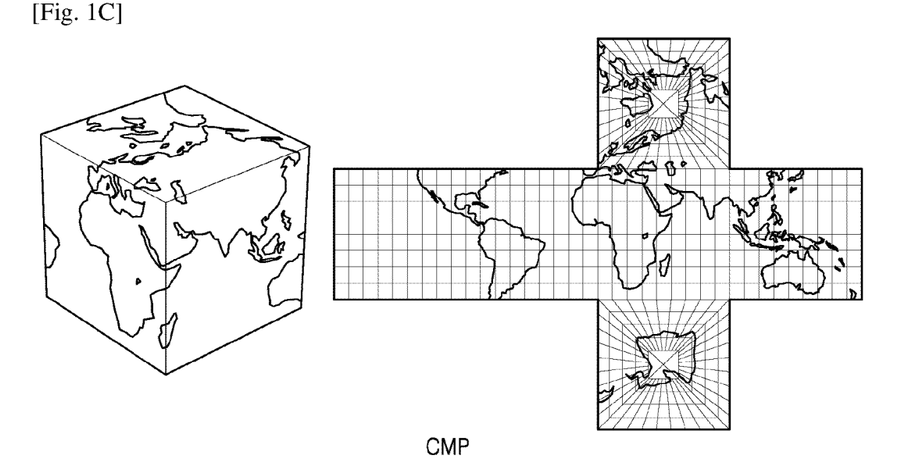
FIG. 1C illustrates an exemplary Cube Map Projection (CMP) according to an embodiment of the disclosure.

FIG. 1C illustrates an exemplary Cube Map Projection (CMP) according to an embodiment of the disclosure. Referring to FIG. 1C, a spherical map may be projected onto a cube based on CMP.

Figure 1D:
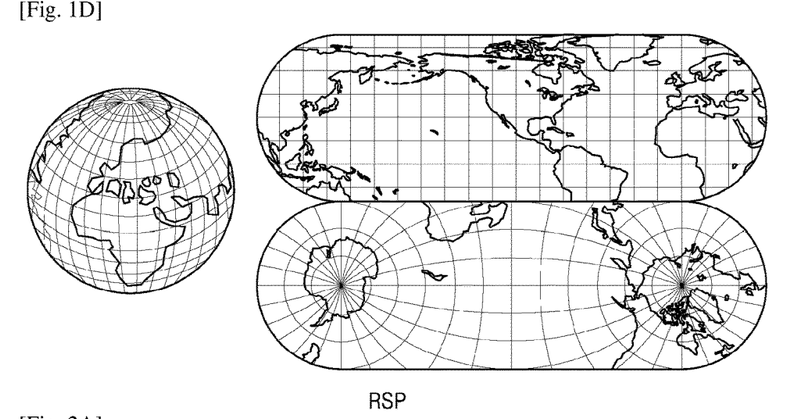
FIG. 1D illustrates an exemplary Rotated Sphere Projection (RSP) according to an embodiment of the disclosure.

FIG. 1D illustrates an exemplary Rotated Sphere Projection (RSP) according to an embodiment of the disclosure. Referring to FIG. 1D, a spherical map may be projected onto a rotated sphere based on RSP.

Figure 2A:
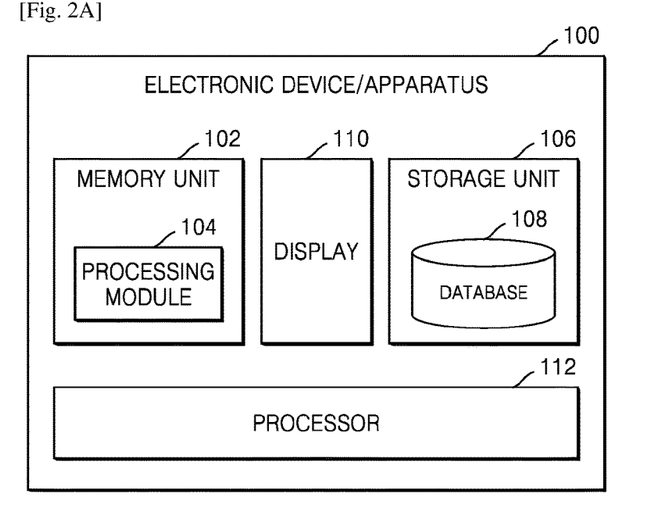
FIG. 2A illustrates a block diagram of an apparatus for determining an adjustment parameter during encoding of a spherical multimedia content, according to an embodiment of the disclosure.

FIG. 2A illustrates a block diagram of an apparatus for determining an adjustment parameter during encoding of a spherical multimedia content, according to an embodiment of the disclosure.

The apparatus 100 may include a memory unit 102, a storage unit 106, a display 110, and a processor 112. The apparatus 100 may further include a processing module 104 implemented in the memory unit 102. When the machine readable instructions are executed, the processing module 104 and/or the processor 112 may process the data in a computing environment. Further, the apparatus 100 can also be referred herein to as an electronic device 100 and the apparatus 100 can act as a server. Examples of the apparatus 100 can be, but not limited to, a mobile phone, a smart phone, a tablet, a handheld device, a phablet, a laptop, a computer, a wearable computing device, a server, an Internet of Things (IoT) device, and so on. The apparatus 100 may include other components such as input/output interface(s), communication interface(s) and so on (not shown). The apparatus 100 may include a user application interface (not shown) and an application management framework (not shown) and an application framework (not shown) for determining the adjustment parameter during encoding of the spherical media content. The application framework can be a software library that provides a fundamental structure to support the development of applications for a specific environment. The application framework may also be used in developing graphical user interface (GUI) and web-based applications. Further, the application management framework may be responsible for the management and maintenance of the application and definition of the data structures used in databases and data files.

In an embodiment herein, the methods herein may be implemented using the apparatus 100. The embodiments herein may perform specified manipulations of data or information in response to a command or set of commands provided by a user.

In an embodiment herein, the methods herein may be implemented using apparatus 100 as a server (not shown). The apparatus 100 can operate as a standalone device or as a connected (e.g., networked) device that connects to other computer systems. In a networked deployment, the apparatus 100 may operate as the server or a client in a server-client network environment, or as a peer device in a peer-to-peer (or distributed) network environment. Further, while only a single computer system is illustrated, a plurality of computing systems may operate to jointly execute instructions to perform any one or more of the methods discussed herein.

In an example, the apparatus 100 can be communicatively connected to a 360 degree camera (not shown) and a separate display device (such as a monitor, television, display, and so on). The 360 degree camera may capture a spherical media and transmit the captured spherical media to the apparatus 100 or an electronic device. The apparatus 100 or the electronic device may process the receive media and transmit the received media to the display device, which can display the processed media. The received media may be in ERP format which may be converted to RSP format and appropriate adjustment are applied while conversion from ERP to RSP. The ERP format may be converted to any other format and may not be limited to only RSP format. Further, the apparatus 100 may also display the processed media without transmitting to the display device. Accordingly, a pre-processing method such as a plurality of image merging or stitch may be performed. The encoding may be performed by apparatus 100 for encoding and generating a bit-stream. The bit-stream transmission module (not shown) in the apparatus 100 may receive the encoded image, to transmit to the decoding device such as the apparatus 100, the TV or electronic device 100. Further, the media may be decoded and processed to output on the display.

Further, the sub-images of the input image or 360 degree image may be arranged in different shapes such as rectangular, triangle, and so on. The spatial structure information may be additionally included in the table index for signaling the allocation information. For example, at least one of, but not limited to, an Equirectangular Projection (ERP), a Cube Map Projection (CMP), an Equal-area Projection (EAP), an Octahedron Projection (OHP), a Viewport generation using rectilinear projection, an IcoSahedron Projection (ISP), a Crasters Parabolic Projection for CPP-PSNR calculation, a Truncated Square Pyramid (TSP), a Segmented Sphere Projection (SSP), an Adjusted Cubemap Projection (ACP), a Rotated Sphere Projection (RSP), and so on, can be illustrated, arranged or converted to different image projection format(s).

Although, embodiments herein use the 360 degree/spherical projection format as an example for description, it may be obvious to a person of ordinary skill in the art that the embodiments herein are not limited to the particular 360 degree/spherical projection format. The embodiments herein can be applied to various projection transformation formats such as CMP, ISP, OHP, TSP, SSP, Equi-angular cube map (EAC), Hybrid Equiangular cube map (HEC), a plurality of faces such as Equatorial cylindrical projection (ECP) or RSP, and so on. If the 360 degree projection media is converted to 2D, then at least one of, but not limited to, appeared square projection (ERP, Equi-rectangular Projection), cube projection transformation (Cube Map Projection, CMP), twenty-face projection transformation (Icosahedral Projection, ISP), octahedron projection transformation (Octahedron Projection, OHP), a pyramid-shaped cutting projection transformation (Truncated pyramid projection, TPP), SSP (Sphere Segment projection), ECP (Equatorial cylindrical projection) or RSP (rotated sphere projection) or the like can be used. In an example, the spherical media content can be at least one of, but not limited to, a video, an image, an animation, and so on.

The implementations described herein are primarily discussed in the context of spherical images that are captured, e.g., using a spherical camera system having two or more camera sensor(s) (e.g., a front camera and a rear camera), however, it should be appreciated that the methods described herein can be equally applied to other image formats.

The spherical multimedia content or projection format(s) may include an image gradient(s) and an edge(s). The image gradient can be a directional change in the intensity or color in an image. For example, a canny edge detection method may be use image gradient for edge detection. Further, a spatial gradient can also be included in spherical multimedia content or projection format(s). The spatial gradient is a gradient whose components are spatial derivatives, i.e., rate of change of a given scalar physical quantity with respect to the position coordinates. In an example, the edge detection methods may search edges based on zero-crossing or by first analyzing a measure of edge strength. Usually a first-order derivative expression such as a gradient magnitude, and then searching for local directional maxima of the gradient magnitude.

In an embodiment, the apparatus 100 may receive or obtain a first multimedia content corresponding to the spherical multimedia content. The apparatus 100 may generate second multimedia contents using the received first multimedia content. The second multimedia contents may be generated by adjusting an adjustment parameter to the first multimedia content. In an embodiment, the apparatus 100 may perform an edge analysis on an image included in the first multimedia content and/or the generated second multimedia content. The edges may include at least one of edge strength, a gradient, a gradient magnitude and a gradient angle. The apparatus 100 may analyze edges with a gradient magnitude associated with the edge strength, and a gradient angle for each of gradients, associated with the first and/or the second multimedia contents. The apparatus 100 may determine a horizontally aligned gradient axis and vertically aligned gradient axis in the gradients associated with the first and/or the second multimedia contents. The apparatus 100 may identify the number of edges aligned to at least one of a vertical axis and a horizontal axis in each of the first and the second multimedia contents based on the edge analysis. The apparatus 100 may detect the second multimedia content with the maximum number of edges aligned to at least one of the vertical axis and the horizontal axis.

Accordingly, streaming spherical multimedia content (or other three dimensional (3D) multimedia content) can consume a significant amount of system resources. For example, an encoded spherical video can include a large number of bits for transmission which can consume a significant amount of bandwidth as well as processing and memory associated with image encoders and image decoders. The video or image can be encoded and streamed to the display device from the apparatus 100 or server (not shown).

For example, the spherical video or image can be encoded as a left image and a right image and packaged (e.g., in a data packet) together with metadata about the left image and the right image. The left image and the right image are then decoded and displayed by the left (e.g., left eye) display and the right (e.g., right eye) display of a Head Mounted Display (HMD).

In an embodiment, the processor 112 of the apparatus 100 is configured to calculate square value of a gradient magnitude value associated with an edge corresponding to a received spherical multimedia content. The processor 112 may accumulate the calculated square value of the gradient magnitude value corresponding to the received spherical multimedia content, and generate an energy map corresponding to the received spherical multimedia content with the accumulated square value of the gradient magnitude value according to at least one of a row number and a column number associated with the spherical multimedia content. The processor 112 may identify a region corresponding to a maximum concentrated energy in the generated energy map. Most active region in the image may have the maximum concentrated energy in the energy map. The processor 112 may determine a width of the identified region corresponding to the maximum concentrated energy in the generated energy map. The processor 112 may output adjustment parameter based on the determined width of the identified region in the energy map, to encode the spherical multimedia content.

In an embodiment, the processor 112 may analyze at least one of the row number and the column number corresponding to an exponential increase in the energy and an exponential decrease in the energy in the energy map associated with the spherical multimedia content. The processor 112 may determine a difference between at least one of the row numbers and the column numbers respectively, corresponding to the exponential increase in the energy and the exponential decrease in the energy, to determine the width of the maximum concentrated energy in the energy map. The processor 112 may derive the adjustment parameter based on the determined width of the maximum concentrated energy in the energy map. The processor 112 may perform adjustment along the at least one of a latitude direction and a longitude direction, in a second format multimedia content corresponding to the spherical multimedia content. The processor 112 may derive an optimal beta value associated with the adjustment parameter, based on the determined width of the maximum concentrated energy in the energy map. The processor 112 may map the adjustment parameter during the encoding of a first format multimedia content to the second format multimedia content, by including the derived optimal beta value. The processor may signal to an image decoder via a bit-stream data, by transmitting the optimal beta value for inverse adjustment of a decoded picture or image.

In an embodiment, the adjustment parameter may include an expansion in the at least one of a region of the spherical multimedia content and/or a contraction in the at least one of a region of the spherical multimedia content. In an embodiment, the expansion and the contraction in the at least one of the region of the spherical multimedia content may include identifying appropriate region in the spherical multimedia content for expansion and/or identifying appropriate region in the spherical multimedia content for contraction. The adjustment parameter may be determined using the edge image and the energy distribution is analyzed to determine the active region in the spherical multimedia content. The adjustment parameter may be inversely proportional to the width of the maximum concentrated energy region in the energy map corresponding to the spherical multimedia content. Encoding the spherical multimedia content may include compressing the spherical multimedia content. The gradient magnitude value associated with the edge image may be generated by applying at least one of an image processing operator and an image processing filter. Applying filter may include convolution with a filter such as a sobel filter, a laplacian filter, a canny filter, and so on. Accumulating the calculated square value of the gradient magnitude value may include accumulating the calculated square value of the gradient magnitude value in a horizontal direction of the spherical multimedia content and in a vertical direction of the spherical multimedia content. The first format multimedia content and the second format multimedia content may include at least one selected from the group of an Equi Rectangular Projection (ERP), a Cube Map Projection (CMP), an Adjusted Equal-area Projection (AEP), an Octa Hedron Projection (OHP), a Viewport generation using rectilinear projection, an IcoSahedron Projection (ISP), a Crasters Parabolic Projection for CPP-PSNR calculation, a Truncated Square Pyramid (TSP) projection, a Segmented Sphere Projection (SSP), an Adjusted Cubemap Projection (ACP), a Rotated Sphere Projection (RSP), an Equi-angular Cubemap Projection (EAC), and an Equatorial Cylindrical Projection (ECP).

The FIG. 2A illustrates functional components of the computer implemented system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Figure 2B:
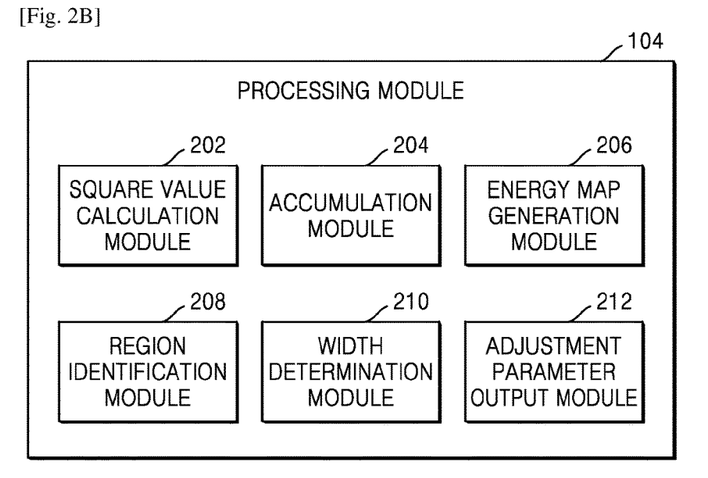
FIG. 2B illustrates a block diagram of a processing module according to an embodiment of the disclosure.

FIG. 2B illustrates a block diagram of a processing module according to an embodiment of the disclosure.

Referring to FIG. 2B, the apparatus 100 may include a processing module 104 implemented in the memory unit 102. The processing module 104 may include a plurality of sub modules. The plurality of sub modules may include a square value calculation module 202, an accumulation module 204, an energy map generation module 206, a region identification module 208, a width determination module 210, and an adjustment parameter output module 212.

In an embodiment, the processing module may not be implemented in the memory unit 102 but may be implemented as at least one hardware processor.

In an embodiment, the square value calculation module 202 may be configured to calculate square value of a gradient magnitude value associated with an edge corresponding to a received spherical multimedia content. The accumulation module 204 may be configured to accumulate the calculated square value of the gradient magnitude value corresponding to the received spherical multimedia content. The energy map generation module 206 may be configured to generate an energy map corresponding to the received spherical multimedia content by adding the accumulated square value of the gradient magnitude value, according to at least one of a row number and a column number associated with the spherical multimedia content. The region identification module 208 may be configured to identify a region corresponding to a maximum concentrated energy in the generated energy map. The width determination module 210 may be configured to determine a width of the identified region corresponding to the maximum concentrated energy in the generated energy map. The adjustment parameter output module 212 may be configured to output adjustment parameter based on the determined width of the identified region in the energy map, to encode the spherical multimedia content.

The embodiments herein can include hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

Figure 3:
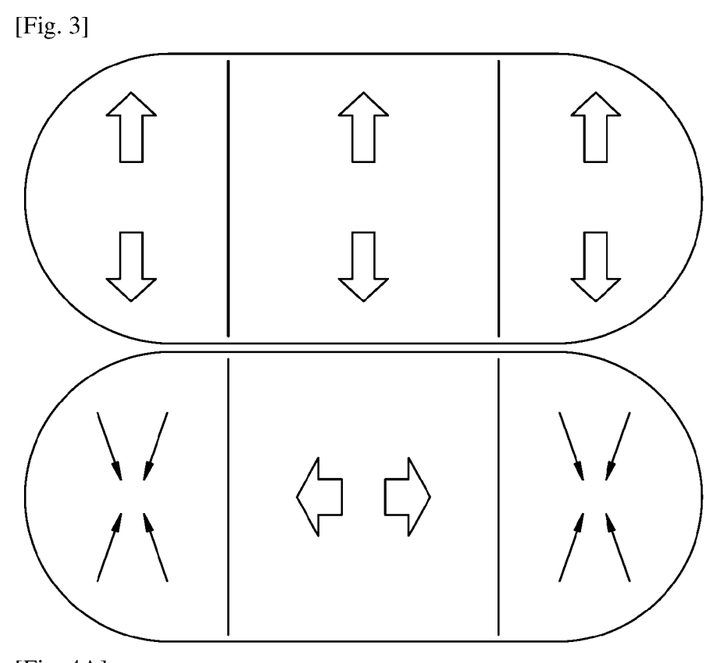
FIG. 3 illustrates a schematic diagram of an adjustment direction in a first face row of multimedia content and a second face row of multimedia content corresponding to the spherical multimedia content according to an embodiment of the disclosure.

FIG. 3 illustrates a schematic diagram of an adjustment direction in a first face row of multimedia content and a second face row of multimedia content corresponding to the spherical multimedia content according to an embodiment of the disclosure.

Referring to FIG. 3, the top image depicts the first format (first face row) multimedia content and the bottom image depicts the second format multimedia content. In an embodiment, the first format multimedia content and the second format multimedia content may be the Rotated Sphere Projection (RSP) format image. However, different image formats may be applied to the first format multimedia content and the second format multimedia content, respectively.

In an embodiment, the adjustment may be performed along the latitude direction in RSP format image with respect to the top image of FIG. 3. In an embodiment, the middle region of the RSP format image is adjusted horizontally and the other region of the RSP format image is adjusted by contracting the region of the RSP format image with respect to the bottom image of FIG. 3. Although the top image depicts the adjustment in latitude direction, the adjustment can also be made in longitude direction. Further, the spherical multimedia content can be expanded and contracted in a desired direction.

Figure 4A:
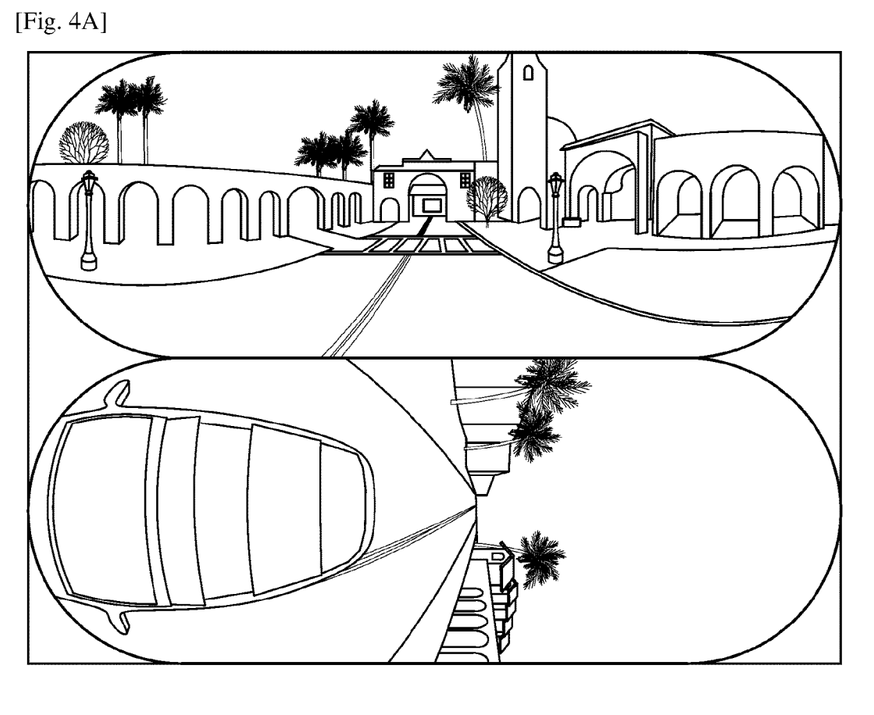
FIG. 4A illustrates a non-adjusted RSP image according to an embodiment of the disclosure.

FIG. 4A illustrates a schematic diagram of a non-adjusted RSP image according to an embodiment of the disclosure.

The first image data associated with a first portion of interest from the first format multimedia content can be retrieved. The first format multimedia content may take a number of different forms. For example, the first format multimedia content may include a static image, frame or picture. The static image may be used for immersing a user within a desired scene (such as adjacent to a historical site). Also, the source image data may include a media sequence of a scene or scenes. For example, the first portion of interest may include image data associated with a first frame (or a first sequence of media frames) for the media sequence, while the second image data associated with the new portion of interest may refer to a second frame (or a second sequence of media frames) for the media sequence.

Figure 4B:
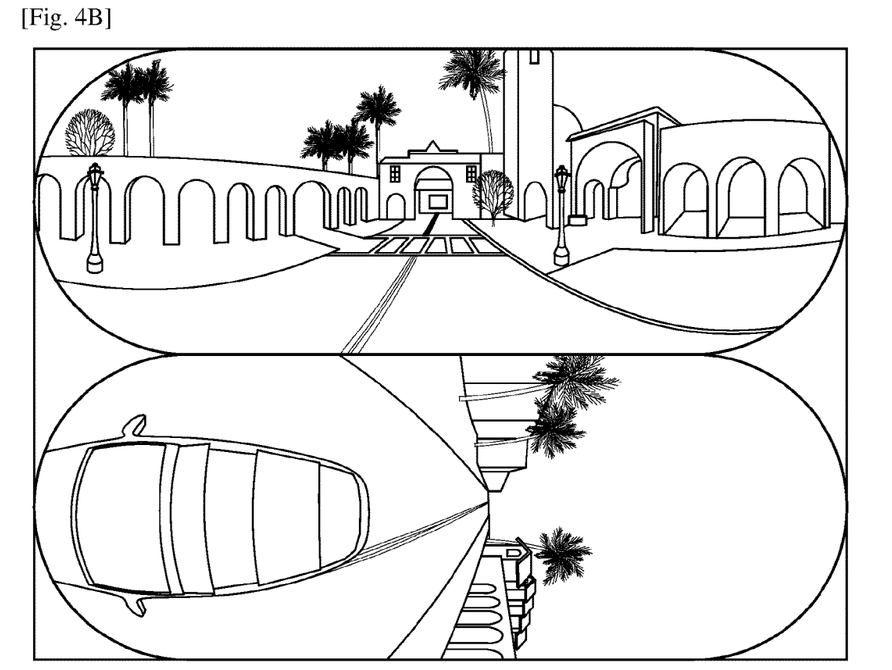
FIG. 4B illustrates an adjusted RSP image converted from the non-adjusted RSP image, according to an embodiment of the disclosure.

FIG. 4B illustrates an adjusted RSP image converted from the non-adjusted RSP image, according to an embodiment of the disclosure.

FIG. 4B depicts the frame from the RSP video sequence, adjusted by the optimal adjustment parameter. Referring FIG. 4B, the adjustment is applied to the top image of FIG. 4A along the latitude direction as depicted in the top image of FIG. 3. Also, the adjustment is applied to the bottom RSP image of FIG. 4A with respect to the center region which is adjusted horizontally and with respect to the right region and the left region which are contracted. The adjustment may be performed based on the beta value in the range of [0,1].

In an example, the RSP image adjustment can be implemented according to the following equations:

In Mapping from RSP to ERP:

$$\text{pitch}=(1/\text{BETA})*\sin^{-1}[(0.5-v)*\sin(\pi*\text{BETA}/2] \quad \text{Equation 1}$$

In Mapping from ERP to RSP:

$$org\_\text{pitch}=\sin^{-1}(y/len) \quad \text{Equation 2}$$

$$y_{adj}=-0.5*(\sin(\text{BETA}*org\_\text{pitch})/\sin(0.5*\text{BETA}*\pi))+0.5 \quad \text{Equation 3}$$

wherein, BETA=1=No Adjustment and BETA can be in range of [0-1], v=intercept along v axis in 2D (U,V) coordinate system, y=intercept along Y axis in 3D XYZ coordinate, len=magnitude vector of input 3D point in 3D XYZ coordinate (so it would be square root of (square(x)+square(y)+square(z)), pitch=latitude in 3D coordinate system (while 2D to 3D conversion), org_pitch=latitude in 3D coordinate system (in 3D XYZ coordinate system), $y_{adj}$=adjusted value of y, and 2D to 3D is conversion from RSP to ERP format and vice versa.

Figure 4C:
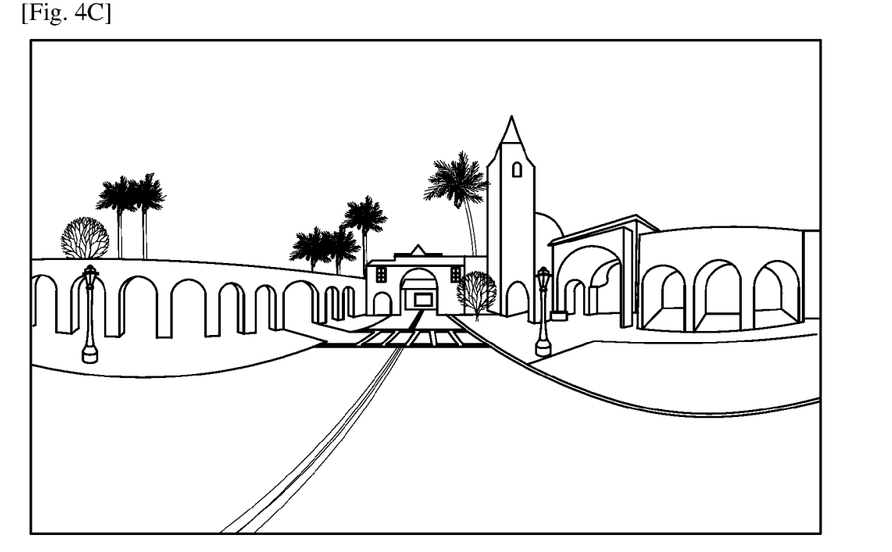
FIG. 4C illustrates a schematic diagram of a non-adjusted ERP image, according to an embodiment of the disclosure.
Figure 4D:
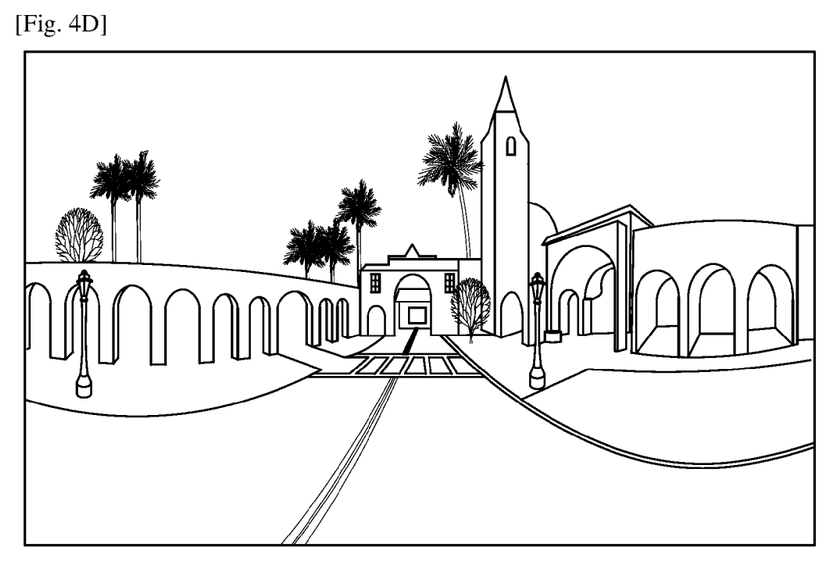
FIG. 4D illustrates a schematic diagram of an adjusted ERP image, according to an embodiment of the disclosure.

FIG. 4C illustrates a schematic diagram of a non-adjusted ERP image, according to an embodiment of the disclosure. FIG. 4D illustrates a schematic diagram of an adjusted ERP image, according to an embodiment of the disclosure.

In an example, it can be observed from the ERP format images that optimally adjusted ERP format image may have higher pixel density for more active content of spherical video. Also, it can be observed that the most complex region of the image is present in the middle part of ERP format image which corresponds to top lobe of RSP format image that has the maximum pixel density. The two observations can be considered as features while deriving the optimal adjustment parameter for RSP format image. Although the analysis is performed using RSP (Rotated Sphere Projection) format image, it can be applied to other 360 degree projection format multimedia content or spherical multimedia content.

Figure 5:
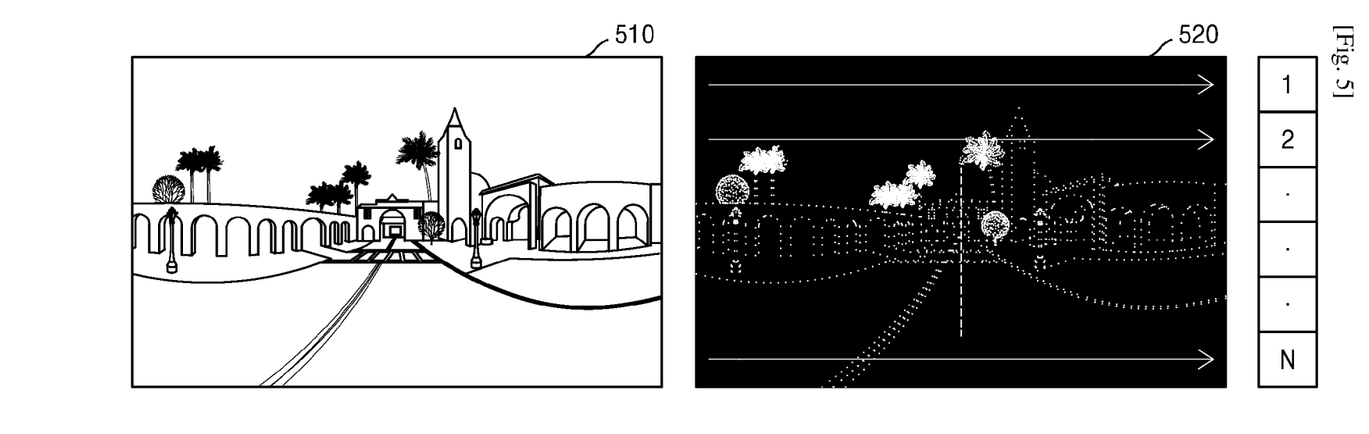
FIG. 5 illustrates a schematic diagram for accumulating a square of a gradient value corresponding to the spherical multimedia content, according to an embodiment of the disclosure.

FIG. 5 illustrates a schematic diagram for accumulating a square of a gradient value corresponding to the spherical multimedia content, according to an embodiment of the disclosure.

For example, the energy map from the input ERP format image may be generated. To generate the energy map, the Sobel filter is initially applied to the ERP format image 510 and the square of gradient magnitude values is accumulated horizontally as depicted in the image 520. The region where maximum energy is concentrated (example, 95%) is determined. The width of the determined region (i.e. difference between the corresponding row numbers) is measured. Accordingly, the optimal adjustment parameter is derived from this width parameter. The adjustment is inversely proportional to the width parameter. This method may be implemented at each Random Access point(s) (RAP) of the spherical multimedia content to adapt to the local temporal statistics of the content.

In an example, the adjustment parameter from the width (w) is derived using the equation 4.

$$\text{optimal BETA}=-5*10^{-8}*w^2-w*10^{-4}+0.5801 \quad \text{Equation 4}$$

However, it may not be limited to above equation, and can include any other way of fitting the curve between w and beta.

The adjustment parameter and the BETA value may need to be signaled explicitly to the decoder. In an example, the bit-stream can be transmitted to the decoder as follows, omnidirectional_projection_indication (payloadSize) {Descriptor
omni_flag u(1)
if(omni_flag) {
projection_type u(4)
packing_type u(2)
yaw_rot i(32)
pitch_rot i(32)
roll_rot i(32)

```
dblk_off u(1)
beta_val u(32)
  }
}
```

The equation may be arrived by allowing the apparatus 100 to analyze spherical multimedia content(s) and the width parameter vs. brute-force computed beta values. The equation can be closest approximation to the obtained curve between brute force computed Beta vs. energy image width parameter.

Figure 6A:
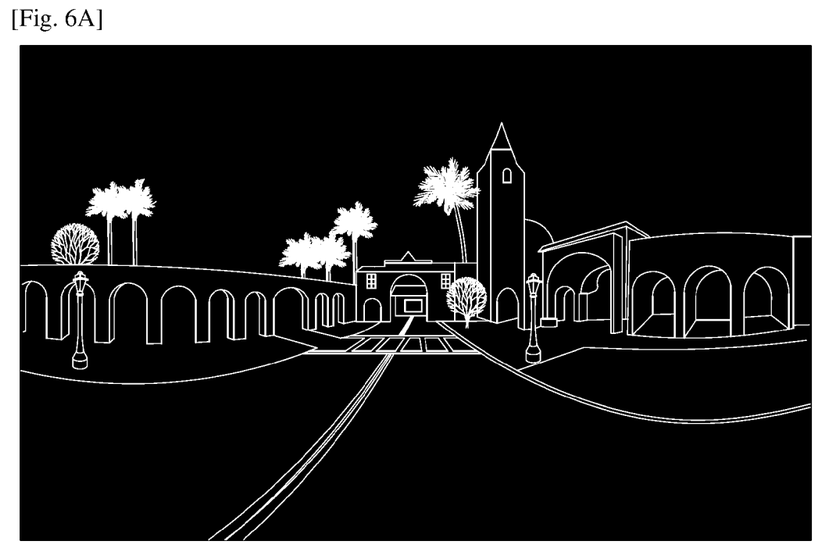
FIG. 6A illustrates a schematic diagram of gradient image from Balboa sequence in ERP image, according to an embodiment of the disclosure.
Figure 6B:
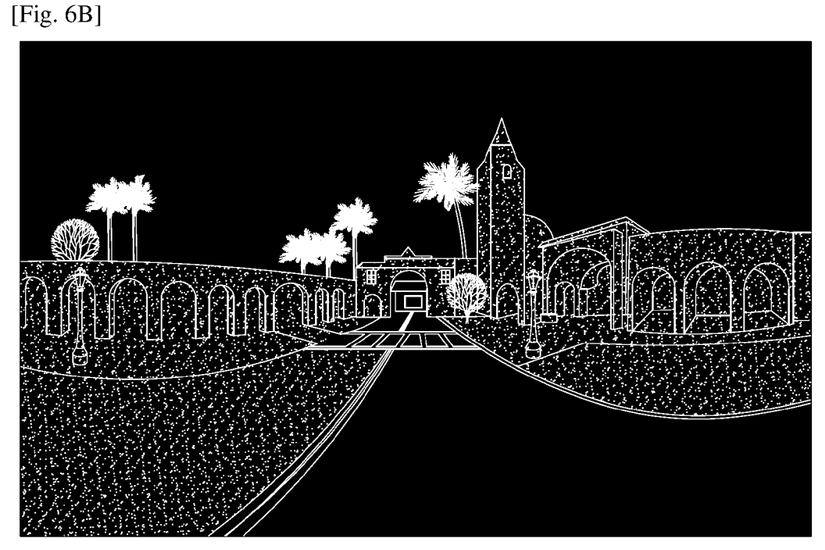
FIG. 6B illustrates a schematic diagram of gradient image from Trolley sequence in ERP image, according to an embodiment of the disclosure.

FIG. 6A illustrates a schematic diagram of gradient image from Balboa sequence in ERP image, according to an embodiment of the disclosure. FIG. 6B illustrates a schematic diagram of gradient image from Trolley sequence in ERP image, according to an embodiment of the disclosure.

The gradient magnitude and gradient angle for each of the gradients of the spherical multimedia content can be analyzed based on an edge detection method such as canny edge detection method. The edge analysis can be performed by applying an image processing operator such as a Sobel operator. The Sobel operator or Sobel filter may be used for edge detection of an image in particular where the edge detection of the image creates an image emphasizing edges. The example frames, Balboa ERP format image and Trolley ERP format image are depicted referring to FIGS. 6A and 6B respectively. The gradient image may be used for generating the energy map. For each row in the gradient image, the square of the gradient value and sum over each row may be determined to arrive at the energy map vector. The length of energy map is equal to the height of the projected ERP spherical multimedia content.

Figure 6C:
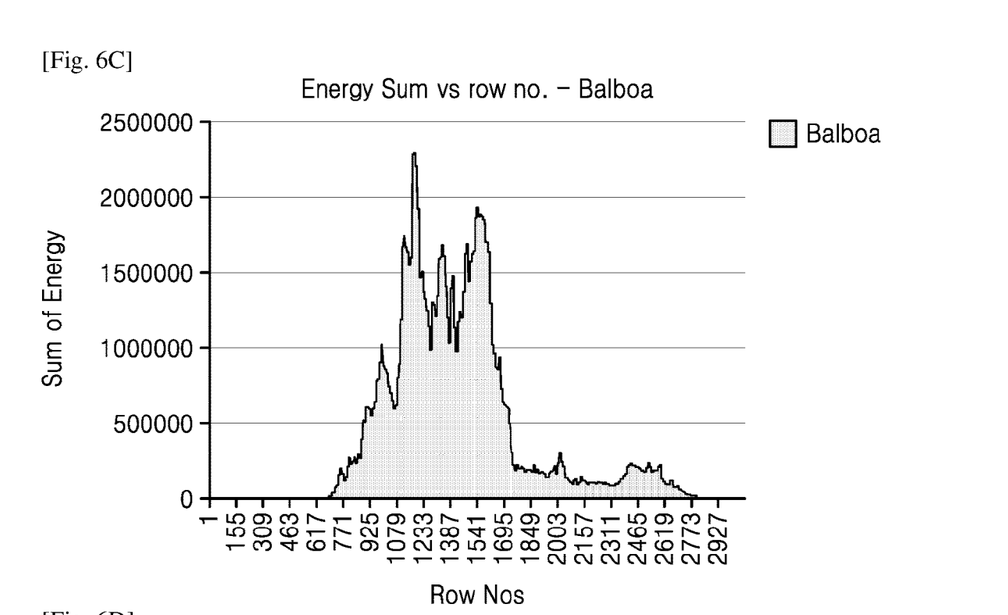
FIG. 6C illustrates an example energy map graph for an image from Balboa sequence, according to an embodiment of the disclosure.
Figure 6D:
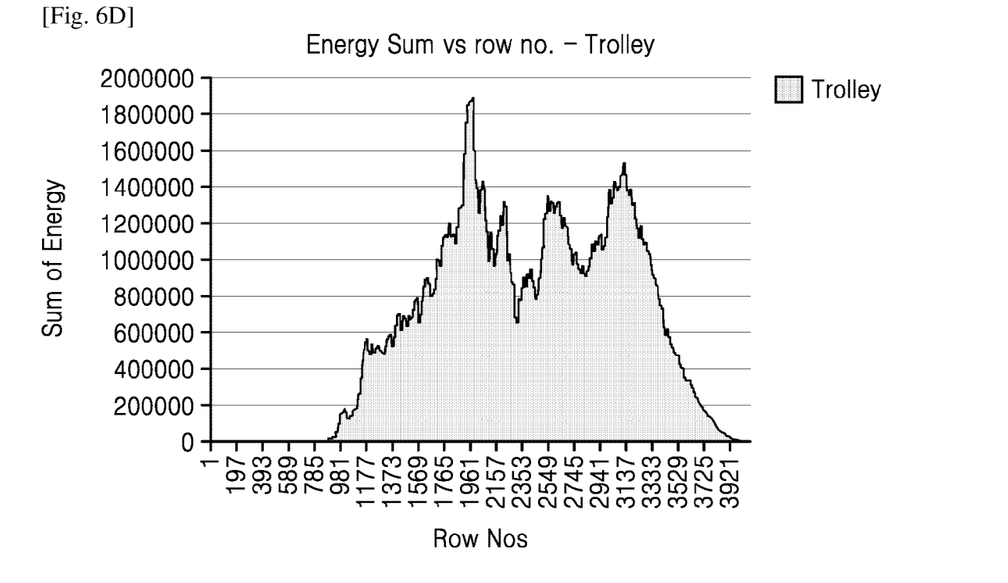
FIG. 6D illustrates an example energy map graph for an image from Trolley sequence, according to an embodiment of the disclosure.

FIG. 6C illustrates an example energy map graph for an image from Balboa sequence, according to an embodiment of the disclosure. FIG. 6D illustrates an example energy map graph for an image from Trolley sequence, according to an embodiment of the disclosure.

In an example, the energy map graph illustrates the energy concentration in the Balboa sequence in FIG. 6C and Trolley sequence in FIG. 6D from row 1 to row N. According to Balboa sequence referring to FIG. 6C, more energy is concentrated in the center of the image which may translate to higher adjustment and referring to FIG. 6D, less energy is concentrated in the center of the image for Trolley sequence.

Figure 7:
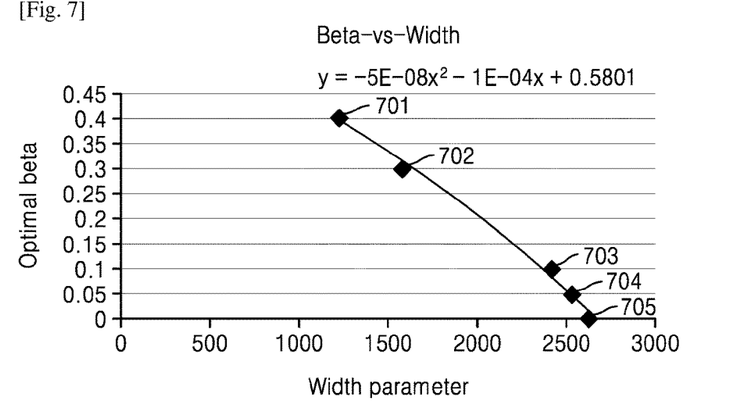
FIG. 7 is an example graph diagram depicting relation between BETA values and width parameter, according to an embodiment of the disclosure.

FIG. 7 is an example graph diagram illustrating relation between BETA values and width parameter, according to an embodiment of the disclosure. In an example, for at least five sequences, the optimal beta versus the width graph may be generated and the polynomial curve can be found fit. For example, the equation derived from five sequences (701, 702, 703, 704, and 705) can be:

$$y = -5 \cdot 10^{-8} * x^2 - x * 10^{-4} + 0.5801 \qquad \text{Equation 5}$$

Figure 8A:
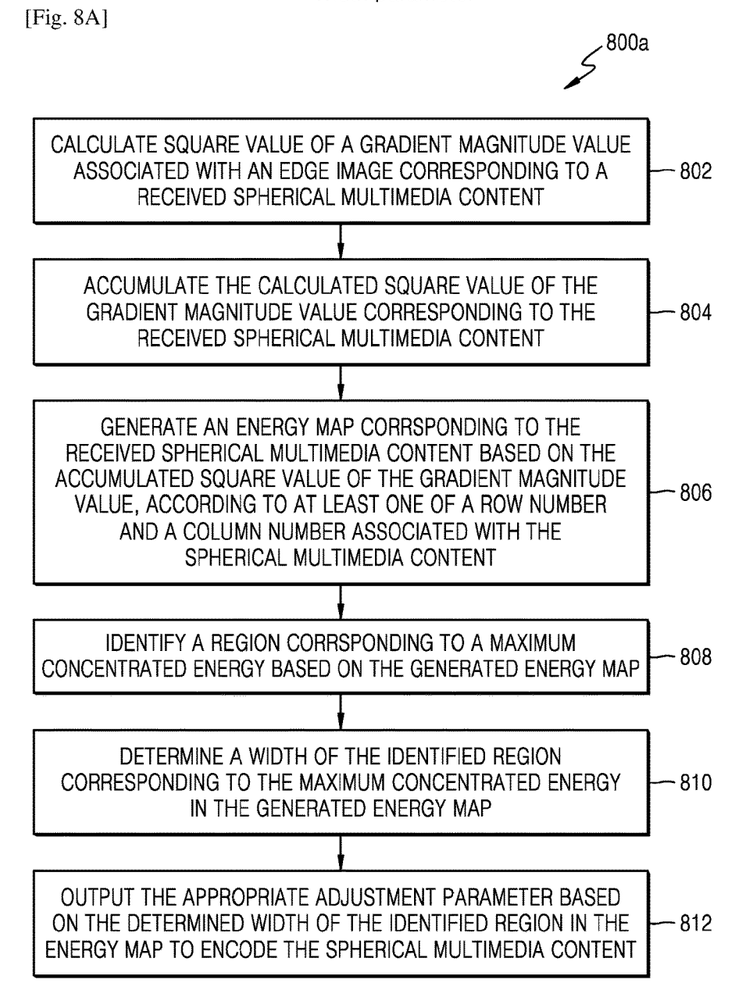
FIG. 8A is a flow chart for determining adjustment parameter during encoding of the spherical multimedia content, according to an embodiment of the disclosure.

FIG. 8A is a flow chart for determining adjustment parameter during encoding of the spherical multimedia content, according to an embodiment of the disclosure.

In operation 802, the apparatus 100 calculates square value of a gradient magnitude value associated with an edge corresponding to a received spherical multimedia content. In operation 804, the apparatus 100 accumulates the calculated square value of the gradient magnitude value corresponding to the received spherical multimedia content. In operation 806, the apparatus 100 generate an energy map corresponding to the received spherical multimedia content by adding the accumulated square value of the gradient magnitude value, according to at least one of a row number and a column number associated with the spherical multimedia content. In operation 808, apparatus 100 identifies a region corresponding to a maximum concentrated energy in the generated energy map. In operation 810, the apparatus 100 determines a width of the identified region corresponding to the maximum concentrated energy in the generated energy map. In operation 812, the apparatus 100 outputs the adjustment parameter based on the determined width of the identified region in the energy map, to encode the spherical multimedia content. The foregoing operations may be performed using processor 112 of the apparatus 100.

The various actions in method 800a may be performed in the order presented, in a different order or simultaneously. Further, in some embodiments, some actions listed in FIG. 8A may be omitted.

Figure 8B:
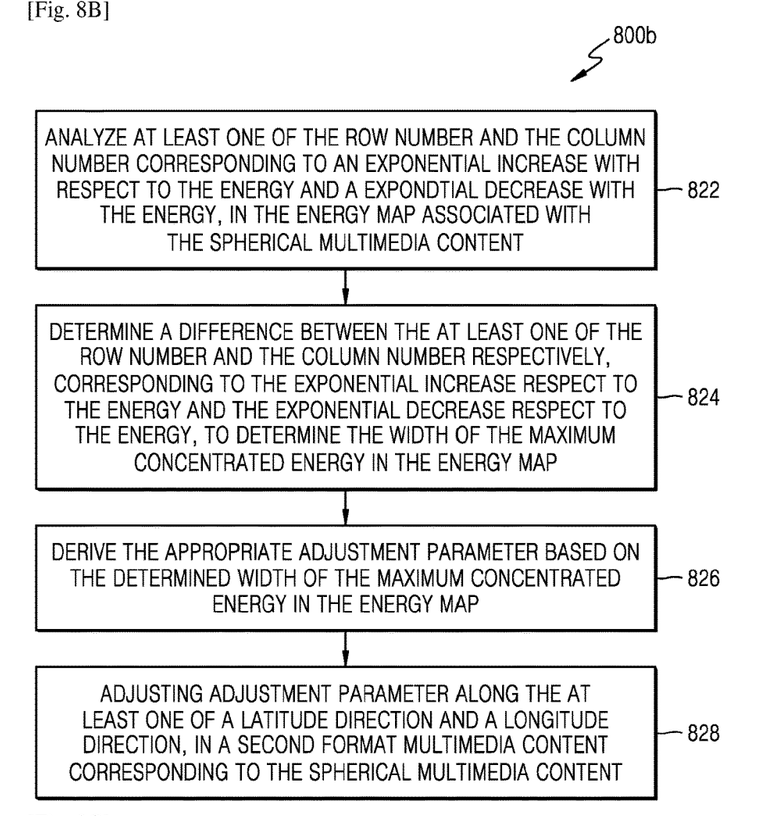
FIG. 8B is a flow chart for performing adjustment along a latitude direction or a longitude direction in the spherical multimedia content, according to an embodiment of the disclosure.

FIG. 8B is a flow chart for performing adjustment along a latitude direction or a longitude direction in the spherical multimedia content, according to an embodiment of the disclosure.

In operation 822, the apparatus 100 analyzes at least one of the row number and the column number corresponding to an exponential increase in the energy and an exponential decrease in the energy, in the energy map associated with the spherical multimedia content. In operation 824, the apparatus 100 determines a difference between at least one of the row number and the column number respectively, corresponding to the exponential increase in the energy and the exponential decrease in the energy, to determine the width of the maximum concentrated energy in the energy map. In operation 826, the apparatus 100 derives the adjustment parameter based on the determined width of the maximum concentrated energy in the energy map. In operation 828, apparatus 100 performs adjustment along the at least one of a latitude direction and a longitude direction, in a second format multimedia content corresponding to the spherical multimedia content. The foregoing operations may be performed using processor 112 of the apparatus 100.

The various actions in method 800b may be performed in the order presented, in a different order or simultaneously. Further, in some embodiments, some operations listed in FIG. 8B may be omitted.

Figure 8C:
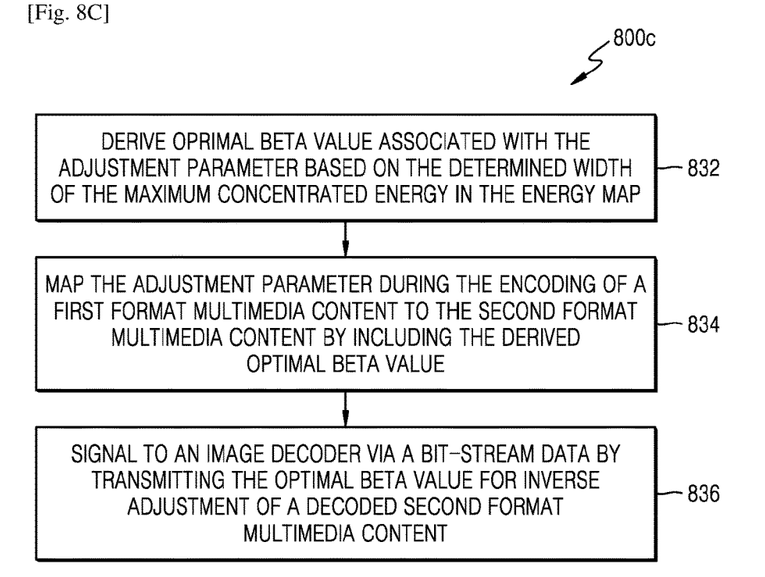
FIG. 8C is a flow chart for outputting an optimal beta value to an image decoder, according to an embodiment of the disclosure.

FIG. 8C is a flow chart for outputting an optimal beta value to an image decoder, according to an embodiment of the disclosure.

In operation 832, the apparatus 100 derives optimal beta value associated with the adjustment parameter, based on the determined width of the maximum concentrated energy in the energy map. In operation 834, the apparatus 100 maps the adjustment parameter during the encoding of a first format multimedia content to the second format multimedia content, by including the derived optimal beta value. In operation 836, the apparatus 100 signals to an image decoder via a bit-stream data, by transmitting the optimal beta value for inverse adjustment of a decoded second format multimedia content.

The various actions in method 800c may be performed in the order presented, in a different order or simultaneously. Further, in some embodiments, some operations listed in FIG. 8C may be omitted.

Embodiments herein disclose a normative change in the 360 degree video codec for enhancing the quality of compressed output by optimally adjusting spherical multimedia content. Embodiments herein enhance the objective quality of the output with less computational requirement. Embodiments herein disclose signalling the optimal beta value in the encoded bit-stream which makes the spherical multimedia content a normative change.

The embodiments disclosed herein can be implemented through at least one software program running on at least one hardware device and performing network management functions to control the elements. The elements shown in FIG. 2A can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. A method for determining an adjustment parameter during encoding of a spherical multimedia content, the method comprising:
   calculating, by a processor, a square value of a gradient magnitude value associated with an edge image corresponding to the spherical multimedia content;
   accumulating the calculated square value of the gradient magnitude value corresponding to the spherical multimedia content;
   generating an energy map corresponding to the spherical multimedia content based on the accumulated square value of the gradient magnitude value according to at least one of a row number and a column number associated with the spherical multimedia content;
   identifying a region corresponding to a maximum concentrated energy based on the energy map;
   determining a width of the region corresponding to the maximum concentrated energy in the energy map; and
   outputting the adjustment parameter based on the width of the region to encode the spherical multimedia content.

2. The method of claim 1, further comprising:
   analyzing, by the processor, the at least one of the row number and the column number corresponding to an exponential increase with respect to energy and an exponential decrease with respect to energy, in the energy map associated with the spherical multimedia content;
   determining a difference between the at least one of the row number and the column number respectively, corresponding to the exponential increase in the energy and the exponential decrease in the energy, to determine the width of the maximum concentrated energy in the energy map;
   deriving the adjustment parameter based on the width of the maximum concentrated energy in the energy map; and
   adjusting the adjustment parameter along at least one of a latitude direction and a longitude direction in a second format multimedia content corresponding to the spherical multimedia content.

3. The method of claim 1, further comprising:
   deriving, by the processor, an optimal beta value associated with the adjustment parameter, based on the width of the maximum concentrated energy in the energy map;
   mapping the adjustment parameter during the encoding of a first format multimedia content to a second format multimedia content by including the derived optimal beta value; and
   outputting a signal to an image decoder via a bit-stream data, by transmitting the optimal beta value for inverse adjustment of a decoded second format multimedia content.

4. The method of claim 1, wherein the adjustment parameter comprises at least one selected from a group of an expansion in at least one region of the spherical multimedia content and a contraction in at least one region of the spherical multimedia content.

5. The method of claim 4, wherein further comprising identifying an appropriate region in the spherical multimedia content for expansion or contraction.

6. The method of claim 1, wherein the adjustment parameter is inversely proportional to the width of the region corresponding to the maximum concentrated energy in the energy map.

7. The method of claim 1, wherein the encoding of the spherical multimedia content comprises compression of the spherical multimedia content.

8. The method of claim 1, wherein the gradient magnitude value associated with the edge image is generated by applying at least one of an image processing operator and an image processing filter.

9. The method of claim 1, wherein accumulating the calculated square value of the gradient magnitude value comprises accumulating the calculated square value of the gradient magnitude value in horizontal direction of the spherical multimedia content or in vertical direction of the spherical multimedia content.

10. The method of claim 3, wherein the first format multimedia content and the second format multimedia content comprises at least one selected from a group of an Equi Rectangular Projection (ERP), a Cube Map Projection (CMP), an Adjusted Equal-area Projection (AEP), an Octa Hedron Projection (OHP), a Viewport generation using rectilinear projection, an IcoSahedron Projection (ISP), a Crasters Parabolic Projection for CPP-PSNR calculation, a Truncated Square Pyramid (TSP) projection, a Segmented Sphere Projection (SSP), an Adjusted Cubemap Projection (ACP), a Rotated Sphere Projection (RSP), an Equi-angular Cubemap Projection (EAC), and an Equatorial Cylindrical Projection (ECP).

11. An apparatus for determining an adjustment parameter during encoding of a spherical multimedia content, the apparatus comprising:
   a memory unit; and
   a processor coupled to the memory unit, configured to:
   calculate square value of a gradient magnitude value associated with an edge image corresponding to the spherical multimedia content,
   accumulate the square value of the gradient magnitude value corresponding to the spherical multimedia content,
   generate an energy map corresponding to the spherical multimedia content based on the accumulated square value of the gradient magnitude value according to at least one of a row number and a column number associated with the spherical multimedia content, identify a region corresponding to a maximum concentrated energy in the energy map, determine a width of the identified region corresponding to the maximum concentrated energy in the energy map, and output the adjustment parameter based on the width of the identified region corresponding to the maximum concentrated energy in the energy map to encode the spherical multimedia content.

12. The apparatus of claim 11, wherein the processor is further configured to:

analyze the at least one of the row number and the column number corresponding to an exponential increase in the energy and an exponential decrease in the energy in the energy map associated with the spherical multimedia content;

determine a difference between the at least one of the row number and the column number respectively, corresponding to the exponential increase in the energy and the exponential decrease in the energy, to determine the width of the maximum concentrated energy in the energy map;

derive the adjustment parameter based on the determined width of the maximum concentrated energy in the energy map; and adjusting the adjustment parameter along the at least one of a latitude direction and a longitude direction in a second format multimedia content corresponding to the spherical multimedia content.

13. The apparatus of claim 11, wherein the processor is further configured to:

derive an optimal beta value associated with the adjustment parameter based on the width of the maximum concentrated energy in the energy map;

map the adjustment parameter during the encoding of a first format multimedia content to a second format multimedia content using the derived optimal beta value; and signal to an image decoder via a bit-stream data by transmitting the optimal beta value for inverse adjustment of a decoded second format multimedia content.

14. The apparatus of claim 11, wherein the adjustment parameter comprises at least one selected from an expansion in at least one region of the spherical multimedia content and a contraction in at least one region of the spherical multimedia content.

15. A non-transitory computer readable medium storing instructions thereon that, when executed, instruct at least one processor to perform a method for determining an adjustment parameter during encoding of a spherical multimedia content, the method comprising:

calculating, by a processor, a square value of a gradient magnitude value associated with an edge image corresponding to the spherical multimedia content;

accumulating the calculated square value of the gradient magnitude value corresponding to the spherical multimedia content;

generating an energy map corresponding to the spherical multimedia content based on the accumulated square value of the gradient magnitude value according to at least one of a row number and a column number associated with the spherical multimedia content;

identifying a region corresponding to a maximum concentrated energy based on the energy map;

determining a width of the region corresponding to the maximum concentrated energy in the energy map; and outputting the adjustment parameter based on the width of the region to encode the spherical multimedia content.

* * * * *